US010301500B2

(12) United States Patent
Hibben et al.

(10) Patent No.: US 10,301,500 B2
(45) Date of Patent: May 28, 2019

(54) WATER-BASED COMPOSITIONS THAT RESIST DIRT PICK-UP

(71) Applicant: Valspar Sourcing, Inc., Minneapolis, MN (US)

(72) Inventors: Mary Jane Hibben, Elburn, IL (US); Mike Wildman, Hoffman Estates, IL (US); T. Howard Killilea, North Oaks, MN (US); Iain Harvey, Crystal Lake, IL (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

(21) Appl. No.: 15/792,863

(22) Filed: Oct. 25, 2017

(65) Prior Publication Data
US 2018/0148595 A1 May 31, 2018

Related U.S. Application Data

(63) Continuation of application No. 14/770,123, filed as application No. PCT/US2014/020719 on Mar. 5, 2014, now Pat. No. 9,822,275.

(60) Provisional application No. 61/836,884, filed on Jun. 19, 2013, provisional application No. 61/799,995, filed on Mar. 15, 2013.

(51) Int. Cl.
*C08K 5/34* (2006.01)
*B22F 1/00* (2006.01)
*C08G 61/04* (2006.01)
*C09D 133/00* (2006.01)
*C09D 5/16* (2006.01)
*C08K 5/053* (2006.01)
*C08K 5/07* (2006.01)
*C08K 5/10* (2006.01)
*C08K 5/103* (2006.01)
*C08K 5/11* (2006.01)
*C08K 5/12* (2006.01)

(52) U.S. Cl.
CPC ............ *C09D 133/00* (2013.01); *C08K 5/053* (2013.01); *C08K 5/07* (2013.01); *C08K 5/10* (2013.01); *C08K 5/103* (2013.01); *C08K 5/11* (2013.01); *C08K 5/12* (2013.01); *C09D 5/16* (2013.01); *C09D 5/1687* (2013.01)

(58) Field of Classification Search
CPC ...... C09D 133/00; C09D 5/16; C09D 5/1687; C08K 5/12; C08K 5/07; C08K 5/103; C08K 5/053; C08K 5/10; C08K 5/11
USPC ................ 524/100, 99, 86, 81, 80, 1; 520/1
See application file for complete search history.

(56) References Cited

U.S. PATENT DOCUMENTS

| 3,214,492 A | 10/1965 | Tocker |
| 3,303,046 A | 2/1967 | Paul et al. |
| 3,320,198 A | 5/1967 | Hill |
| 3,429,852 A | 2/1969 | Skoultchi |
| 4,071,645 A | 1/1978 | Kahn |
| 4,255,308 A | 3/1981 | Brasen |
| 5,248,805 A | 9/1993 | Boettcher et al. |
| 5,385,815 A | 1/1995 | Schofield et al. |
| 5,629,365 A | 5/1997 | Razavi |
| 5,780,117 A * | 7/1998 | Swartz .................. C08G 59/18 427/493 |
| 5,824,716 A | 10/1998 | Coqueret et al. |
| 5,861,232 A * | 1/1999 | Kanda ..................... G03F 7/033 430/281.1 |
| 5,942,368 A | 8/1999 | Akiyama et al. |
| 5,990,228 A | 11/1999 | Eichman et al. |
| 6,258,887 B1 | 7/2001 | Bardman et al. |
| 6,303,188 B1 | 10/2001 | Bors et al. |
| 6,376,570 B1 | 4/2002 | Zhao et al. |
| 6,740,692 B2 | 5/2004 | Weitzel et al. |
| 6,762,230 B2 | 7/2004 | Brandenburger et al. |
| 6,930,141 B2 | 8/2005 | Gebhart et al. |
| 7,101,921 B2 | 9/2006 | Edwards et al. |
| 7,138,438 B2 | 11/2006 | Lauer et al. |
| 7,812,079 B2 | 10/2010 | Brandenburger et al. |
| 7,923,513 B2 | 4/2011 | Killilea et al. |
| 8,110,624 B2 | 2/2012 | Brandenburger et al. |
| 8,440,751 B2 | 5/2013 | Kohnke et al. |
| 8,440,752 B2 | 5/2013 | Brandenburger et al. |
| 8,507,579 B2 | 8/2013 | Sheerin et al. |
| 8,653,180 B2 | 2/2014 | Koziski et al. |
| 8,802,765 B2 | 8/2014 | Yang et al. |
| 9,120,936 B2 | 9/2015 | Hibben et al. |
| 9,822,275 B2 | 11/2017 | Hibben et al. |
| 2002/0026006 A1 * | 2/2002 | Garcia ............... C08G 18/0823 524/591 |
| 2002/0151648 A1 | 10/2002 | Fasano |

(Continued)

FOREIGN PATENT DOCUMENTS

| CN | 1288030 A | 3/2001 |
| CN | 1670096 A | 9/2005 |

(Continued)

OTHER PUBLICATIONS

ASTM D2244-02. Standard Practice for Calculation of Color Tolerances and Color Differences from Instrumentally Measured color Coordinates. 1993. 10 pages.
ASTM D2369-90. Standard Test Method for Volatile Content of Coatings. 1990. 5 pages.
ASTM D3960-02. Standard Practice for Determining Volatile Organic Compound (VOC) Content of Paints and Related Coatings. 2002. 8 pages.
ASTM D6886-12. Standard Test Method for Determination of the Individual Volatile Organic Compounds (VOCs) in Air-Dry Coatings by Gas Chromatography. 2012. 7 pages.

(Continued)

*Primary Examiner* — Jessica Whiteley
(74) *Attorney, Agent, or Firm* — Mueting, Raasch & Gebhardt, P.A.

(57) ABSTRACT

Water-based compositions containing a low VOC coalescent, a latex or water-dispersible polymer, and a water-insoluble UV-VIS (preferably, ultraviolet) absorber.

20 Claims, No Drawings

(56) References Cited

U.S. PATENT DOCUMENTS

| | | |
|---|---|---|
| 2002/0156163 A1 | 10/2002 | Brandenburger et al. |
| 2002/0160205 A1* | 10/2002 | Garcia ................ C08F 283/006 428/423.1 |
| 2003/0018121 A1 | 1/2003 | Weitzel et al. |
| 2004/0131787 A1 | 7/2004 | Fang |
| 2005/0009954 A1* | 1/2005 | Gebhard ............... C08F 220/18 523/210 |
| 2005/0032954 A1 | 2/2005 | Brandenburger et al. |
| 2005/0203211 A1* | 9/2005 | Gebhard ............... C08F 265/06 523/205 |
| 2005/0215678 A1 | 9/2005 | Ludtke et al. |
| 2006/0111503 A1 | 5/2006 | Killilea et al. |
| 2006/0135684 A1* | 6/2006 | Killilea .............. C08G 18/0823 524/556 |
| 2007/0110981 A1 | 5/2007 | Killilea et al. |
| 2007/0248837 A1 | 10/2007 | Hsu et al. |
| 2008/0058473 A1 | 3/2008 | Freidzon |
| 2009/0149591 A1 | 6/2009 | Yang et al. |
| 2009/0312469 A1 | 12/2009 | Koziski et al. |
| 2009/0326121 A1 | 12/2009 | Stockl et al. |
| 2010/0015360 A1 | 1/2010 | Kyota |
| 2011/0112223 A1 | 5/2011 | Yang et al. |
| 2011/0245390 A1* | 10/2011 | Yang ........................ C08K 5/07 524/241 |
| 2012/0041092 A1 | 2/2012 | Bohannon |
| 2012/0129974 A1 | 5/2012 | DeNotta et al. |
| 2013/0116359 A1 | 5/2013 | Bohannon |
| 2013/0210985 A1 | 8/2013 | Brandenburger et al. |
| 2014/0256862 A1 | 9/2014 | Palmer et al. |
| 2014/0275315 A1 | 9/2014 | Hibben et al. |
| 2014/0275388 A1 | 9/2014 | Rokowski et al. |
| 2015/0275388 A1 | 10/2015 | Yoshida et al. |
| 2016/0053127 A1* | 2/2016 | Hibben ................... C09D 5/16 524/292 |
| 2017/0029654 A1 | 2/2017 | Hibben et al. |
| 2017/0073543 A1 | 3/2017 | Joecken et al. |
| 2017/0096567 A1 | 4/2017 | Brandenburger et al. |
| 2017/0174904 A1 | 6/2017 | Hibben et al. |
| 2017/0327709 A1* | 11/2017 | Sandoval ................ C09D 5/00 |
| 2018/0016376 A1 | 1/2018 | Belowich et al. |
| 2018/0148595 A1 | 5/2018 | Hibben et al. |

FOREIGN PATENT DOCUMENTS

| | | |
|---|---|---|
| EP | 0010000 A1 | 4/1980 |
| EP | 2133376 A1 | 12/2009 |
| FR | 2786777 A1 | 12/1998 |
| GB | 1189560 | 4/1970 |
| JP | 4117461 A | 4/1992 |
| WO | WO 94/000524 A1 | 1/1994 |
| WO | WO 99/58608 A1 | 11/1999 |
| WO | WO 00/06643 A1 | 2/2000 |
| WO | WO 2002/068547 A1 | 9/2002 |
| WO | WO 2005/097917 A1 | 10/2005 |
| WO | WO 2006/065914 A1 | 6/2006 |
| WO | WO 2007/087458 A1 | 8/2007 |
| WO | WO 2010/008713 A1 | 1/2010 |
| WO | WO 2011/145024 A1 | 11/2011 |
| WO | WO 2012/028627 A1 | 3/2012 |
| WO | WO 2013/138209 A1 | 9/2013 |
| WO | WO 2014/149756 A1 | 9/2014 |
| WO | WO 2016/053595 A1 | 4/2016 |
| WO | WO 2018/032410 A1 | 2/2018 |

OTHER PUBLICATIONS

EPA, Technical Overview of Volatile Organic Compounds, 2009.
"High Lights! Radiation curing with resins and photoinitiators for industrial coatings and graphic arts: Laromer®, Irgacure®, Lucirin®, Darocur®." BASF SE, Lufwigshafen, Germany [retrieved on Aug. 6, 2014]. Retrieved from the Internet: <URL: http://www.basf.com/group/corporate/en_GB/literature- document:/Brand+Darocur-Brochure--High+lights+Radiation+curing+with+resins+and+photoinitiators+for+industrial+coatings+and+graphic+arts+Laromer+Irgacure+Lucirin+Darocur-English.pdf; 44pgs.
International Search Report (and Written Opinion (PCT/ISA/237), dated Jun. 18, 2014, in connection with Patent Application No. PCT/US2014/020719, filed Mar. 5, 2014; 13 pgs.
International Search Report and Written Opinion dated Jan. 6, 2016, in connection with Patent Application No. PCT/US2015/049659. 14 pages.
International Preliminary Report on Patentability, dated Sep. 24, 2015, in connection with Patent Application No. PCT/US2014/020719, filed Mar. 5, 2014; 10 pgs.
International Preliminary Report on Patentability, dated Mar. 14, 2017, in connection with Patent Application No. PCT/US2015/049659, filed Sep. 11, 2015; 8pgs.
TCEQ, 2,2,4-trimethyl-1,3-pentanediol monoisobutyrate, Texas Commission on Environmental Quality, 2013.

* cited by examiner

WATER-BASED COMPOSITIONS THAT RESIST DIRT PICK-UP

RELATED APPLICATIONS

This application is a continuation of U.S. patent application Ser. No. 14/770,123, filed Aug. 25, 2015, pending, which is the § 371 U.S. National Stage of International Application No. PCT/US2014/020719, filed Mar. 5, 2014, which claims the benefit under 35 U.S.C. § 119(e) of U.S. Provisional Patent Application Nos. 61/799,995, filed Mar. 15, 2013 and 61/836,884, filed Jun. 19, 2013, each of which are hereby incorporated by reference in its entirety.

BACKGROUND

Water-based compositions, e.g., coating compositions such as paints, that include latex polymer particles or water-dispersible polymer particles typically also include a coalescent (i.e., coalescing agent or film-forming agent) in addition to pigments and fillers, for example. The coalescent functions as a solvent as well as a plasticizer for the polymer particles (to soften the polymer particles and assist in the formation of a continuous coating or film, for example, after applying it to a surface and allowing it to dry).

Useful coalescents are generally stable in the presence of water, compatible with other ingredients typically used in paint formulations, particularly the polymer particles, such that the stability of the water-based composition is not compromised. They are also typically sufficiently volatile to escape when the applied composition is allowed to dry, but sufficiently nonvolatile to evaporate more slowly than other ingredients that delay film formation (e.g., drying retarders, antifreezes). However, there is a general desire in the industry to reduce volatile organic emissions, thereby reducing the environmental and health concerns.

Although new and improved coalescents have been developed that provide low VOC compositions, such compositions can still be relatively soft and tacky. From the moment it is applied, a low VOC composition, such as a paint, seal coat, caulk, etc. is exposed to contamination from the atmosphere. This contamination includes dirt and dust that are carried to the surface by rain, airborne moisture droplets, wind currents or direct physical contact with people, animals or other objects. Dirt can be either organic or inorganic. Examples of dirt particles include sand, smoke particles, dust, metallic fibres, carbon black, rust, grease, pollen, human detritus, and fungal spores. Dirt particles attract moisture to the surface of the composition. This moisture provides a suitable environment in which microbial spores may survive and proliferate into colonies, thus further contributing to the unsightly appearance of the surface. Accordingly, water-based compositions can acquire a dirty and unsightly appearance because of the amount of air-borne dirt that clings to them. An effective dirt pick-up resistance technology which is suitable for low VOC compositions, and which does not compromise the required application and performance properties of surface finishes, is a common goal of the paint industry.

SUMMARY

The present disclosure provides water-based compositions, such as coating compositions, containing a low VOC coalescent, a latex polymer or water-dispersible polymer, and a water-insoluble UV-VIS (preferably, ultraviolet) absorber, and methods of making such compositions.

In one method of the present disclosure, a method of preparing a water-based composition is provided wherein the method includes:
providing an aqueous polymer including a latex or water-dispersible polymer in water;
providing an additive package including at least one of a pigment, a thickener, a mildewcide, a biocide, a defoamer, a surfactant, a dispersant, a filler, and combinations thereof;
providing one or more water-insoluble UV-VIS (preferably, ultraviolet) absorbers capable of absorbing radiation within a range of 240-465 (preferably, 240-400) nm;
providing one or more low VOC coalescents having a volatile organic content of 30% or less, or that elute from a GC column at the same time or after methyl palmitate under the same conditions;
mixing (preferably, dissolving) the one or more water-insoluble UV-VIS (preferably, ultraviolet) absorbers in the one or more low VOC coalescents to form an absorber-coalescent mixture (preferably, solution); and
combining the aqueous polymer, the additive package, and the absorber-coalescent to form a water-based coating.

In another embodiment, a method of preparing a water-based composition is provided that includes:
providing an aqueous polymer including a latex polymer in water;
providing an additive package including at least one of a pigment, a thickener, a mildewcide, a biocide, a defoamer, a surfactant, a dispersant, a filler, and combinations thereof;
providing one or more water-insoluble UV-VIS (preferably, ultraviolet) absorbers capable of absorbing radiation within a range of 240-465 (preferably, 240-400) nm;
providing one or more low VOC coalescents having a volatile organic content of 30% or less, or that elute from a GC column at the same time or after methyl palmitate under the same conditions;
dissolving the one or more water-insoluble UV-VIS (preferably, ultraviolet) absorbers in the one or more low VOC coalescents to form an absorber-coalescent solution;
mixing the absorber-coalescent solution with the aqueous polymer; and
subsequently mixing the aqueous polymer, having the absorber-coalescent therein, with the additive package.

The present disclosure also provides a water-based composition prepared by a method as described herein.

Definitions

The term "latex" means a dispersion of polymer particles in water; a latex polymer typically requires a secondary dispersing agent (e.g., a surfactant) for creating a dispersion or emulsion of polymer particles in water having at least a one-month shelf stability at normal storage temperatures.

The term "water-dispersible" in the context of the polymer means one that is itself capable of being dispersed into water for creating a dispersion or emulsion of polymer particles in water having at least a one-month shelf stability at normal storage temperatures.

The term "dispersible" in the context of a dispersible coalescent means that the coalescent can be mixed into the water-based composition of latex or water-dispersible polymer particles to form a uniform mixture without the use of high shear mixing.

The term "stable" in the context of a water-based composition containing a dispersible coalescent means that the coalescent does not phase separate from the water-based composition upon standing at 120° F. (49° C.) for at least four weeks.

The terms "volatile organic content" and "VOC" in the context of the coalescent herein mean the volatility of the coalescent as measured by ASTM D2369-90 or ASTM D6886-12. ASTM D2369-90 involves weighing out approximately 0.5 gram (g) of coalescent into an aluminum weighing dish and placing it in a forced air oven at 110° C. for 1 hour. The dish is then reweighed and the mass lost represents the percent (%) VOC of the coalescent. Alternatively, ASTM D6886-12 involves a gas chromatography method and the relative elution from a gas chromatography column relative to methyl palmitate. For the purposes of this application, any compound that elutes after methyl palmitate following ASTM D6886-12 is not considered a VOC.

The terms "volatile organic content" and "VOC" in the context of the composition mean the volatility of the composition as measured by ASTM D3960-02 or ASTM D6886-12. According to ASTM D3960-02, this involves using the following calculation: [(weight percent of total volatiles less water less exempt volatile compounds)*(density of paint)/100%−(volume percent of water)]−(volume percent of exempt volatile compounds). In this context, "exempt" from VOC include compounds such as acetone and t-butyl acetate. According to ASTM D6886-12, this involves quantifying each component that elutes before methyl palmitate and adding up the total amount of each such component to get the total VOC of the composition.

The term "organic group" means a hydrocarbon (i.e., hydrocarbyl) group with optional elements other than carbon and hydrogen in the chain, such as oxygen, nitrogen, sulfur, and silicon that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated linear or branched hydrocarbon group with one or more carbon-carbon double bonds, such as a vinyl group. The term "alkynyl group" means an unsaturated linear or branched hydrocarbon group with one or more carbon-carbon triple bonds. The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mono- or polynuclear aromatic hydrocarbon group. The term "heterocyclic group" means a closed ring hydrocarbon in which one or more of the atoms in the ring is an element other than carbon (e.g., nitrogen, oxygen, sulfur, etc.).

Substitution is anticipated on the organic groups of the coalescents used in the compositions of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. The term "hydrocarbyl moiety" refers to unsubstituted organic moieties containing only hydrogen and carbon.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a," "an," "the," "at least one," and "one or more" are used interchangeably. Thus, for example, a composition that comprises "a" coalescent can be interpreted to mean that the composition includes "one or more" coalescents.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, the statement "up to" a number (e.g., "up to 50") includes that number (e.g., 50).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION OF ILLUSTRATIVE EMBODIMENTS

The present disclosure provides water-based compositions, such as coating compositions, particularly paints, containing a low VOC coalescent, a latex or a water-dispersible polymer, and a water-insoluble UV-VIS (preferably, ultraviolet) absorber. Preferably, the water-based compositions are in the form of paints, although sealers, caulks, and sealants are within the scope of the present disclosure.

The water-based compositions of the present disclosure are advantageous in that they have a relatively low volatile organic content without sacrificing the balance of properties desired for an applied (i.e., dry) composition, such as a coating of paint. Governments have established regulations setting forth guidelines relating to volatile organic compounds (VOC) that may be released into the atmosphere. Such regulations vary from region to region, but the most stringent regulations are in the south coast region (e.g., Los Angeles County and Orange County, Calif.). Such regulations also vary by product. For example, clear topcoats can have no more than 200 grams per liter (g/l), water-borne coatings can have no more than 50 g/l, pigmented lacquers can have no more than 275 g/l VOC.

Reducing the volatility of coalescents, solvents, plasticizers, etc. can adversely affect the balance of properties needed in water-based compositions, especially with respect to dirt pick-up. Thus, there is a need for compositions that possess desirable stability, compatibility, film formation ability, low dirt pick-up, etc.

Compositions of the present disclosure possess these properties while possessing low total VOC in the water-based compositions. In certain embodiments, the water-based compositions include no greater than 25 grams per 100 grams polymer solids, or no greater than 20 grams per 100 grams polymer solids, or no greater than 15 grams per 100 grams polymer solids, or no greater than 10 grams per 100 grams polymer solids, or no greater than 5 grams per 100 grams polymer solids, or no greater than 2 grams per 100 grams polymer solids.

Stated another way, in certain embodiments wherein the water-based compositions of the present disclosure are paints, they include no greater than 25 grams per liter of paint, or no greater than 20 grams per liter of paint, or no greater than 15 grams per liter of paint, or no greater than 10 grams per liter of paint.

UV-VIS Absorbers (Photoinitiators)

Compounds that are suitable for use in the present disclosure as UV-VIS absorbers include ultraviolet absorbers, visible light absorbers, or combinations thereof. These are typically referred to as photoinitiators.

Suitable UV-VIS absorbers are water-insoluble. By this it is meant that the compounds will not dissolve to an appreciable extent (i.e., will not dissolve in an amount of more than 5 wt-%) in water at the temperatures typically used for preparing water-based compositions as described herein.

In certain embodiments, suitable UV-VIS absorbers are those compounds capable of absorbing ultraviolet and/or visible radiation within a range of 240-465 nm. For certain embodiments, they are capable of absorbing radiation in the 280-450 nm range.

In certain embodiments, suitable visible light absorbers are those compounds capable of absorbing visible radiation within a range of 420-450 nm.

In certain embodiments, suitable ultraviolet absorbers are those compounds capable of absorbing UV radiation within a range of 240-400 nm. For certain embodiments, they are capable of absorbing UV radiation in the 280-400 nm range, and for certain embodiments in the 315-375 nm range.

Herein, the UV-VIS (preferably, ultraviolet) absorbers do not form a bond to the polymer, although they are capable of generating a radical through a hydrogen-abstraction mechanism by absorbing UV-VIS (typically, UV) radiation. Although not wishing to be bound by theory, it may be that this results in surface crosslinking of the polymer.

Examples of suitable ultraviolet absorbers include the following:

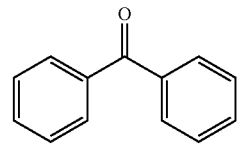 [SMILES: O=C(c1ccccc1)c1ccccc1]

Benzophenone, available from Lamberti, Gallaratte, Italy;

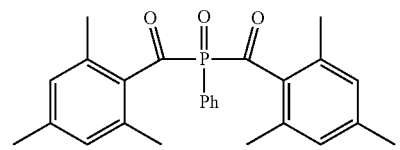

Phenylbis(2,4,6-trimethylbenzoyl)phosphine oxide, available under the trade name IRGACURE 819DW from BASF, Florham Park, N.J.;

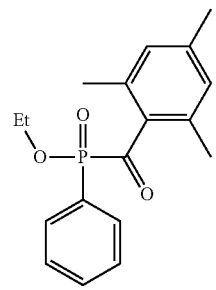 [SMILES: CCOP(=O)(C(=O)c1c(C)cc(C)cc1C)c1ccccc1]

Ethyl-2,4,6-trimethylbenzoylphenylphosphinate, available under the trade name LUCIRIN TPO-L (formerly: LUCIRIN LR 8893) from BASF, Florham Park, N.J.;

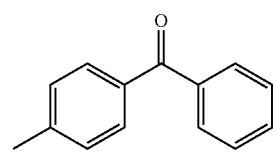

-continued

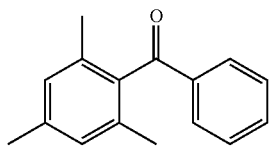

2,4,6-trimethylbenzophenone & 4-methylbenzophenone, available as a mixture under the trade name ESACURE TZT from Lamberti, Gallaratte, Italy;

2,2-Dimethoxy-1,2-diphenylethanone (i.e., Benzildimethylketal), available under the trade name ESACURE KB 1 from Lamberti;

1-Hydroxycyclohexyl phenyl ketone (i.e., a-hydroxycyclohexylphenylketone), available under the trade name ESACURE KS 300 from Lamberti;

2-Hydroxy-2-methyl-1-phenyl-1-propanone, available under the trade name ESACURE KL 200 from Lamberti;

Polymeric Benzophenone, available under the trade name EBECRYL P39 from Cytec, Woodland Park, N.J.;

Isopropylthioxanthone, available under the trade name GENOCURE ITX from Rahn USA, Aurora, Ill.;

Methyl-o-benzoyl-benzoate, available under the trade name GENOCURE MBB from Rahn;

Methylbenzoylformate, available under the trade name GENOCURE MBF from Rahn;

Benzoin ethyl ether, available from Aldrich. St. Louis, Mo.;

4'-Ethoxyacetophenone, from Aldrich. St. Louis, Mo.; and combinations thereof.

Other suitable UV-VIS absorbers are available commercially from BASF under the trade designations IRGACURE and LUCERIN.

The amount of the UV-VIS (preferably, ultraviolet) absorbers present in the water-based compositions of the present disclosure includes an amount that provides the desired result. In certain embodiments, the water-based composition of the present disclosure includes a sufficient amount of the one or more water-insoluble UV-VIS (preferably, ultraviolet) absorbers to improve dirt pick-up resistance by at least 10%, or at least 20%, or at least 30%, or at least 40%, or at least 50%, relative to the same water-based composition without the UV-VIS (preferably, ultraviolet) absorber, based on a change in ΔE values.

A coating discolors when it picks up dirt. AE is measured by a spectrophotometer by comparing the paint that is exposed to dirt and the paint that is "clean" of dirt. The difference is expressed as ΔE. ΔE can be measured using a suitable spectrophotometer (e.g., Datacolor Check II Spectrophotometer using CIELab software) following ASTM D2244, Standard Test Method for Calculation of Color Differences From Instrumentally Measured Color Coordinates.

The difference in ΔE's from the "control" paint and the "experimental" paint can then be calculated. The improvement in dirt pick-up resistance can be expressed as a percentage by taking the difference in ΔE divided by the ΔE of the "control" paint.

In certain embodiments, the water-based compositions of the present disclosure include at least 0.1 wt-%, or at least 0.3 wt-%, or at least 0.5 wt-%, of one or more UV-VIS (preferably, ultraviolet) absorbers, based on the weight of the polymer solids. In certain embodiments, the water-based compositions of the present disclosure include up to 5.0 wt-%, or up to 3.0 wt-%, or up to 1.5 wt-%, or up to 1.0 wt-%, of one or more UV-VIS (preferably, ultraviolet) absorbers, based on the weight of the polymer solids.

Coalescents

Suitable coalescents for use in water-based compositions of the present disclosure are those compounds that assist in coalescing latex or water-dispersible particles. That is, compounds that are good coalescents advantageously provide good film forming properties for the latex or water-dispersible polymer particles.

Preferably, the coating compositions include one or more coalescent compounds having a relatively low volatile organic content (VOC), and more preferably, a relatively low molecular weight.

Typically, the volatile organic content of suitable coalescents, as determined by ASTM D2369-90, is 30% or less, 20% or less, 15% or less, 11% or less, or 10% or less, based on the original weight of the coalescent.

Alternatively stated, suitable low volatile organic content coalescents can be identified by ASTM D6886-12 in terms of their elution from a gas chromatography column relative to methyl palmitate. Those coalescents that elute before methyl palmitate are too volatile to be useful in the water-based compositions of the present disclosure. Those coalescents that elute at the same time as or after methyl palmitate are sufficiently low VOC coalescents for use in the water-based coating compositions of the present disclosure. Typically, using the standard chromatography conditions specified in ASTM D6886-12 compounds that elute at 18.4 minutes or more are acceptable. Those that elute at 20 minutes or more are more acceptable, and those that elute at 22 minutes or more are even more acceptable. Typically, suitable compounds elute at up to 30 minutes, or up to 28 minutes, or up to 26 minutes. Preferably, the number average molecular weights of such compounds are 750 or less, and more preferably, 500 or less.

In certain embodiments, suitable low VOC coalescents assist in the formation of a continuous coating or film from the latex or water-dispersible particles after applying a coating composition containing such particles (e.g., a paint) to a surface and allowing it to dry (preferably, in certain embodiments, drying occurs while not reacting with the polymer particles) at room temperature for at least 7 days.

In certain embodiments, a particularly desirable group of low VOC coalescents are those that provide good film forming properties at low temperatures (e.g., below room temperature). Preferably, such compounds facilitate the formation of polymer films of the polymer particles at a temperature of less than 25° C. (more preferably, at a temperature of 4° C. to 10° C., and most preferably, at a temperature of 4° C. to 5° C.).

Suitable coalescents are dispersible in the water-based compositions, which are preferably stable over time. By this it is meant, the coalescent does not phase separate from the water-based composition upon standing at 49° C. for four weeks.

In certain embodiments, suitable low VOC coalescents are compatible with the polymer and other components in the system. That is, they are nonreactive in the composition. In certain embodiments, they are not crosslinkers of the polymer or otherwise reactive with the polymer.

In certain embodiments, suitable low VOC coalescents are not polymerizable monomers, such as acrylates and methacrylates.

The low VOC coalescents can optionally also function as plasticizers and/or solvents. In particular, suitable low VOC coalescents are those that can function as solvents for the UV-VIS (preferably, ultraviolet) absorbers.

In certain embodiments, the concentration of the UV-VIS (preferably, ultraviolet) absorber in the coalescent is at least 5 percent by weight (wt-%), or at least 10 wt-%, or at least 20 wt-%, or at least 25 wt-%, based on total weight of the mixture (preferably, solution). In certain embodiments, the concentration of the UV-VIS (preferably, ultraviolet) absorber in the coalescent is up to 30 wt-%, or up to 40 wt-%, or up to 50 wt-%, based on the total weight of the mixture (preferably, solution). In certain embodiments, the absorber-coalescent mixtures (preferably, solutions) include 25-30 wt-% of one or more UV-VIS (preferably, ultraviolet) absorbers. Typically, an amount of less than 5 wt-% does not deliver enough absorber to the final water-based composition for effective improvement in dirt pick-up resistance.

In certain embodiments, such low VOC coalescents are of the formula:

$$R^1-(C(O)-X_r-O)_n-R^2$$

wherein: n is 1 to 10; $R^1$ is an organic group, preferably, having less than 100 carbon atoms, and more preferably, having 3 to 24 carbon atoms; $R^2$ is hydrogen or an organic group, preferably, having less than 100 carbon atoms; and X is a divalent organic group, preferably, having 2 to 8 carbon atoms, and more preferably, 3 to 5 carbon atoms; and r is 0 to 1. Preferably, n is 1 to 5, more preferably, n is 1 to 3, and most preferably, n is 2 to 3.

Preferably, $R^1$ is a hydrocarbyl moiety, although for certain preferred embodiments $R^1$ is an organic group that includes substituents selected from the group of nonperoxidic oxygen atoms, carbonyl groups, hydroxyl groups, and combinations thereof, more preferably, substituents selected from the group of nonperoxidic oxygen atoms, hydroxyl groups, and combinations thereof, and most preferably, nonperoxidic oxygen atoms. For certain embodiments, $R^1$ has the formula $R^3-(CH_2)_m-(O(CH_2)_p)_q-$ wherein $R^3$ is an alkyl or aryl group, m is 0 to 24, p is 1 to 4 (preferably, p is 1 to 2), and q is 0 to 50. In this preferred formulation for $R^1$, m+pq is preferably less than 23.

Preferably, X is a divalent hydrocarbyl moiety, although for certain preferred embodiments, X is an organic group that includes substituents selected from the group of nonperoxidic oxygen atoms, carbonyl groups, and combinations thereof, and more preferably, nonperoxidic oxygen atoms and carbonyl groups. For certain embodiments, X has the formula $-(CH_2)_s-$ wherein s is 2 to 8, and preferably, s is 3 to 5.

For certain embodiments, X includes unsaturation. Preferably, X includes at least one carbon-carbon double bond. A preferred example of such a compound is bis(2-ethylhexyl)maleate (i.e., dioctyl maleate), which is available from commercial sources such as Aldrich Chemical Co., Milwaukee, Wis.

Preferably, $R^2$ is hydrogen, although for certain preferred embodiments $R^2$ is $R^1$ as defined above. For certain embodiments, r is one, preferably when $R^2$ is hydrogen.

For certain embodiments, $R^1$ includes at least three carbon atoms when X is not —$(CH_2)_s$— wherein s is 2 to 8; and $R^1$ and $R^2$ together include less than two aliphatic unsaturated carbon-carbon bonds when r is zero, preferably, $R^1$ and $R^2$ together do not include any aliphatic unsaturated carbon-carbon bonds when r is zero, and more preferably, $R^1$ and $R^2$ together do not include any aliphatic unsaturated carbon-carbon bonds.

For certain embodiments, $R^1$ is an organic group having 3 to 24 carbon atoms and substituents selected from the group of oxygen atoms, carbonyl groups, hydroxyl groups, and combinations thereof; and $R^2$ is hydrogen.

A preferred group of such compounds have the formula:

$$R^1\text{—}(C(O)\text{—}X_r\text{—}O)_n\text{—}R^2$$

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$— wherein s is 2 to 8; with the proviso that the coalescent has less than two aliphatic unsaturated carbon-carbon bonds when r is zero. Such compounds can be made from caprolactone and an alcohol, for example.

Another preferred group of such compounds have the formula:

$$R^1\text{—}(C(O)\text{—}X_r\text{—}O)_n\text{—}R^2$$

wherein: $R^1$ is an organic group; X is a divalent organic group; r is 0 to 1; n is 1 to 10; and $R^2$ is hydrogen or an organic group; with the proviso that $R^1$ includes at least three carbon atoms when X is not —$(CH_2)_s$— wherein s is 2 to 8; with the proviso that the coalescent does not include aliphatic unsaturated carbon-carbon bonds; with the proviso that r is one when $R^2$ is hydrogen.

Another preferred group of such compounds have the formula:

$$R^1\text{—}(C(O)\text{—}X_r\text{—}O)_n\text{—}R^2$$

wherein: $R^1$ has the formula $R^3$—$(CH_2)_m$—$(O(CH_2)_p)_q$— wherein $R^3$ is an alkyl or aryl group, m is 0 to 24, p is 1 to 4, and q is 0 to 50; X has the formula —$(CH_2)_s$—, wherein s is 2 to 8; r is 0 to 1; n is 1 to 10; and $R^2$ is hydrogen or $R^1$.

Another preferred group of such compounds have the formula:

$$R^1\text{—}(C(O)\text{—}X\text{—}O)_n\text{—}H$$

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10. Such compounds can be made from a glycidyl ester of neodecanoic acid (e.g., CARDURA E10) and a carboxylic acid, for example.

Another preferred group of such compounds have the formula:

$$R^1\text{—}(C(O)\text{—}X\text{—}O)_n\text{—}H$$

wherein: $R^1$ is a hydrocarbyl moiety or an organic group containing substituents selected from the group of nonperoxidic oxygen atoms, hydroxyl groups, and combinations thereof; X has the formula —$(CH_2)_s$—, wherein s is 2 to 8; and n is 1 to 10.

Another preferred group of such compounds have the formula:

$$R^1\text{—}(C(O)\text{—}X\text{—}O)_n\text{—}H$$

wherein: $R^1$ is a hydrocarbyl moiety or an organic group containing nonperoxidic oxygens; X is an organic group containing nonperoxidic oxygens and carbonyl groups; and n is 1 to 10.

In certain embodiments, a coalescent has the formula:

$$R^1\text{—}(C(O)\text{—}X_r\text{—}O)_n\text{—}R^2$$

wherein: $R^1$ is an organic group having at least 3 and less than 100 carbon atoms; X is a divalent organic group; r is 0 or 1; n is 1 to 10; and $R^2$ is hydrogen or an organic group having at least 3 and less than 100 carbon atoms.

In certain embodiments, a coalescent has the formula:

$$R^1\text{—}(C(O)\text{—}X_r\text{—}O)_n\text{—}R^2$$

wherein: $R^1$ is an organic group having at least 3 and less than 100 carbon atoms, wherein the organic group is an aliphatic group, alicyclic group, heterocyclic group, or combinations thereof; X is a divalent organic group; r is 1; n is 1; and $R^2$ is hydrogen or an organic group having at least 3 and less than 100 carbon atoms; with the proviso that $R^1$ and $R^2$ together do not include any aliphatic unsaturated carbon-carbon bonds.

In certain embodiments, a coalescent has the formula:

$$R^1\text{—}(C(O)\text{—}O)\text{—}R^2$$

wherein: $R^1$ is an aromatic group having 3 to 24 carbon atoms; and $R^2$ is a hydrocarbyl moiety having 3 to 24 carbon atoms; with the proviso that $R^1$ and $R^2$ together do not include any aliphatic unsaturated carbon-carbon bonds.

In certain embodiments, a coalescent has the formula:

$$R^1\text{—}(C(O)\text{—}O)\text{—}R^2$$

wherein: $R^1$ is an organic group having at least 3 and less than 100 carbon atoms, wherein the organic group is an aliphatic group, alicyclic group, heterocyclic group, or combinations thereof; $R^2$ is an organic group having less than 100 carbon atoms, wherein the organic group includes a hydroxyl group; and the coalescent has 1 to 2 aliphatic unsaturated carbon-carbon bonds.

In certain embodiments, a coalescent has the formula:

$$R^1\text{—}(C(O)\text{—}X\text{—}O)_n\text{—}H$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; and n is 1 to 10; and the coalescent has 1 to 2 aliphatic unsaturated carbon-carbon bonds.

In certain embodiments, a coalescent has the formula:

$$R^1\text{—}(C(O)\text{—}X\text{—}O)_n\text{—}R^2$$

wherein: $R^1$ is an organic group having at least 3 and less than 100 carbon atoms, wherein the organic group is an aliphatic group, alicyclic group, heterocyclic group, or combinations thereof; X is a divalent organic group; n is 1 to 10; $R^2$ is an organic group having less than 100 carbon atoms; the coalescent has one aliphatic unsaturated carbon-carbon bond, with the proviso that $R^1$ and $R^2$ together do not include any aliphatic unsaturated carbon-carbon bonds.

In certain embodiments, a coalescent has the formula:

$$R^1\text{—}(C(O)\text{—}X\text{—}O)_n\text{—}R^2$$

wherein: $R^1$ is an organic group having at least 3 and less than 100 carbon atoms, wherein the organic group is an aliphatic group, alicyclic group, heterocyclic group, or combinations thereof; X is a divalent organic group including an oxygen atom; n is 1 to 10; and $R^2$ is an organic group having less than 100 carbon atoms and includes one carbonyl group;

with the proviso that the coalescent does not include any aliphatic unsaturated carbon-carbon bonds.

In certain embodiments, a coalescent has the formula:

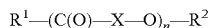

wherein: $R^1$ is an aliphatic hydrocarbyl moiety and comprises 3 to 24 carbon atoms, X is a divalent organic group including oxygen atoms and 2 to 8 carbon atoms, n is 1, and $R^2$ is an organic group including 3 to 24 carbon atoms and one carbonyl group; with the proviso that the coalescent does not include any aliphatic unsaturated carbon-carbon bonds.

In certain embodiments, a coalescent has the formula:

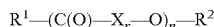

wherein: $R^1$ is a hydrocarbyl moiety having 3 to 24 carbon atoms, wherein the hydrocarbyl moiety is an aliphatic moiety, alicyclic moiety, heterocyclic moiety, or combinations thereof; X is a divalent organic group having 2 to 8 carbon atoms; r is 1; n is 1; and $R^2$ is an organic group having less than 100 carbon atoms and includes a carbonyl group; with the proviso that $R^1$ and $R^2$ together do not include any aliphatic unsaturated carbon-carbon bonds.

In certain embodiments, a coalescent has the formula:

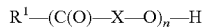

wherein: $R^1$ is a hydrocarbyl moiety or an organic group containing substituents selected from the group of nonperoxidic oxygen atoms, hydroxyl groups, and combinations thereof; X is a divalent hydrocarbyl moiety or an organic group containing nonperoxidic oxygen atoms and carbonyl groups; and n is 1 to 10.

In certain embodiments, a coalescent has the formula:

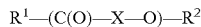

wherein: $R^1$ comprises an aromatic group having at least 3 and less than 100 carbon atoms; X is a divalent organic group comprising one or more nonperoxidic oxygen atoms; $R^2$ comprises an aromatic group having at least 3 and less than 100 carbon atoms; with the proviso that $R^1$ and $R^2$ together do not include any aliphatic unsaturated carbon-carbon bonds.

Examples of suitable low VOC coalescents include, for example, those disclosed in U.S. Pat. No. 8,440,752. Specific examples include, for example: tergitols (e.g., that are available under the trade name TERGITOL, such as TERGITOL 15-S-15 from Dow), alkyl phthalate esters (e.g., dimethyl phthalate, diethyl phthalate, dibutyl phthalate, dioctyl phthalate, di-2-ethylhexyl phthalate, heptyl nonyl undecyl phthalate, butyl cyclohexyl phthalate, and dicyclohexyl phthalate); aryl phthalate esters (e.g., diphenyl phthalate); alkyl aryl phthalate esters (e.g., butyl benzyl phthalate); alkyl citrate esters (e.g., tributyl citrate and triethyl citrate); isosorbide di-alkyl ethers (e.g., dimethyl and diethyl isosorbide ether); alkyl maleates (e.g., dioctyl maleate and bis(2-ethylhexyl) maleate); alkyl adipate esters (e.g., bis(2-ethylhexyl) adipate and dioctyl adipate); alkyl aryl adipate esters (e.g., benzyl octyl adipate); benzoate esters (e.g., diethylene glycol dibenzoate, isodecyl benzoate, oxtyl benzoate); azelates (e.g., bis(2-ethylhexyl)azelate); ricinoleic acid esters; polyethylene glycol ethers; tri(ethylene glycol)bis(2-ethylhexanoate); tetra(ethylene glycol)bis(2-ethylhexanoate); glyceryl monooleate; octadecenoic acid methyl ester, and oleic acid monoester of propylene glycol; and fatty acid/oil derivatives such as those available from ADM under the trade designation ARCHER RC.

Examples of preferred low VOC coalescents include bis(2-ethylhexyl) maleate, bis(2-ethylhexyl) adipate, bis(2-ethylhexyl) azelate, isodecyl benzoate, tri(ethylene glycol) bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid monoester of propylene glycol.

These compounds can be formed using standard organic synthesis techniques, which are well known to one of skill in the art.

The amount of the one or more low VOC coalescents present in the water-based compositions of the present disclosure includes an amount that provides the desired result. Preferably, one or more relatively low VOC coalescents, are present in a water-based composition in an amount of at least 1 wt-%, or at least 2 wt-%, or at least 3 wt-%, or at least 4 wt-%, or at least 5 wt-%, based on polymer solids. Preferably, one or more relatively low VOC coalescents are present in a water-based composition in an amount of up to 10 wt-%, or up to 20 wt-%, based on polymer solids. When mixtures of such coalescents are used, the numerical values of the variables in the formulas described herein are averages.

Polymers

The preferred polymers of the latex-based compositions of the present disclosure include latex or water-dispersible polymers. These are well known in the paint art and are typically particles emulsified or suspended in an aqueous medium.

Suitable polymers are thermoplastic polymers with a relatively high molecular weight (e.g., 50,000 to greater than 1,000,000 Daltons). The polymers can have a wide range of glass transition temperatures, depending on the desired properties of the resultant coating. For example, suitable polymers include those that have at least one Tg within a range of −20° C. to 70° C., or −20° C. to 60° C., or −10° C. to 30° C.

A variety of latex polymers may be employed in the disclosed compositions including (meth)acrylics, vinyls, oil-modified polymers, polyesters, polyurethanes, polyamides, chlorinated polyolefins, and mixtures or copolymers thereof. Latex polymers are readily synthesized at modest cost, and are typically prepared through chain-growth polymerization, using one or more ethylenically unsaturated compounds (preferably monomers). Non-limiting examples of olefinic compounds which may be used to prepare latex polymers include ethylene, butadiene, propene, butene, iso-butene, acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxypropyl acrylate, hydroxybutyl acrylate, hydroxybutyl methacrylate, glycidyl methacrylate, 4-hydroxybutyl acrylate glycidylether, acrylamide, methylacrylamide, styrene, α-methyl styrene, vinyl toluene, vinyl acetate, vinyl propionate, allyl methacrylate, acetoacetyl ethyl methacrylate (AAEM), diacetone acrylamide, dimethylaminomethacrylate, diethylaminomethacrylate, N-hydroxy(meth)acrylamide, vinyl ether maleate, vinyl esters of VERSATIC acid (VERSATIC acid is a synthetic saturated monocarboxylic acid of highly branched structure containing about 5 to about 10 carbon atoms), and mixtures thereof.

In certain embodiments, latex polymers include, for example, the polymerization products of ethylenically unsaturated monomers, such as alkyl and alkoxy acrylates or methacrylates, vinyl esters of saturated carboxylic acids, monoolefins, conjugated dienes, optionally with one or more monomers, such as, for example, styrene, methyl methacrylate, butyl acrylate, 2-ethylhexyl acrylate, vinyl acetate, acrylonitrile, and vinyl chloride.

In certain embodiments, the latex polymer particles include a homopolymer or copolymer including at least one of an acrylate or a methacrylate.

Exemplary commercially available latex polymers include AIRFLEX EF811 (available from Air Products), EPS 2533, EPS 2757, EPS 2792, EPS 2705 (available from EPS/CCA) and NEOCAR 2300, NEOCAR 820 and NEOCAR 2535 (available from Arkema), RHOPLEX VSR 50, RHOPLEX VSR 2015, (available from Dow Chemical Co.), Optive 130 and OPTIVE 230 from BASF. Other exemplary latex polymers include the latex polymers described in U.S. patent application No. US 2007/0110981 A1.

Surfactants suitable for use with latex polymers include, for example, sodium lauryl sulfate, sodium laureth sulfate (DISPONIL series from BASF), sodium dodecyl benzene sulfonate, RHODAFAC RE 610, RHODAFAC RS 410, RHODAFAC RS 610, RHODAFAC RS 710, ABEX EP 100, ABEX EP 110 (Rhodia/Solvay), POLYSTEP B1, POLYSTEP B330 (Stepan, Northfield, Ill.), sodium dioctyl sulfosuccinate, and the like.

Suitable water-dispersible polymers include polyurethanes, epoxies, polyamides, chlorinated polyolefins, acrylics, oil-modified polymers, polyesters, and mixtures or copolymers thereof, for example. Such polymers are readily synthesized and made to be water dispersible using conventional techniques. For example, the incorporation of amine or acid functionality produces water dispersibility.

Oil-modified polymers can also be used if desired. Such polymers are readily synthesized and can be made to be water-dispersible using conventional techniques. As used herein, oil-modified polymers are broadly defined to include polymers that contain oils and/or oil based derivatives such as glyceride oils (monoglycerides, diglycerides, and the like), fatty acids, fatty amines, and mixtures thereof. Examples of such oil-modified polymers include, alkyds, oil-modified polyurethanes, oil-modified epoxies, oil-modified polyamides, oil-modified acrylics, and mixtures or copolymers thereof. Preferably, the oil-modified polymer is an oil-modified polyurethane or an alkyd.

Suitable polymers also include multi-stage latexes (i.e., those with at least two Tg peaks). In such polymers, generally, there is a hard and a soft phase so the Tg peaks could be −30° and +100° in the same polymer mixture. Frequently these polymers are referred to as core-shell, but could also be other morphologies like "raspberry-like" or "acorn-like."

Suitable polymers also include "gradient" polymers in which there is a water-based changing composition (or Tg) during polymerization. Often these types of polymers will not exhibit a sharp inflection point corresponding to a Tg when measured by DSC.

The amount of the latex or water-dispersible polymers present in the coating compositions of the present disclosure includes an amount that provides the desired result. Preferably, one or more polymers is used in an amount of at least 10 wt-%, based on 10-25% solids of the paint for flats and 15-35% for semi-gloss paints. Preferably, one or more polymers is present in an amount of up to 25 wt-%, based on solids.

The amount of the polymers is dependent upon the type of product, and if a paint, the finish of the paint. For example, a flat paint may have a lower percentage of polymer than satin or semi-gloss sheens, in general.

Optional Additives

Other components of the coating compositions of the present disclosure include those typically used in paint formulations, such as pigments (in a pigment grind), fillers, thickeners, biocides, mildewcides, surfactants, dispersants, defoamers, and the like. The coating compositions can be made using standard techniques known in the paint industry. Typical PVC (pigment volume concentrations) ranges for flat paints are 35-75 and for semi gloss are 20-40.

The types of additives that can be incorporated into a water-based composition of the present disclosure depends on the use of the composition. For example, a paint includes one or more pigments (referred to as a pigment grind). A sealer typically may just include a defoamer and possibly a surfactant. A caulk or sealant includes similar additives to that of a paint.

In certain embodiments, a paint contains sufficient $TiO_2$ pigment to be substantially visually opaque when applied at a thickness of 3 mils (0.0762 mm) and dried.

Methods of Addition

The UV-VIS (preferably, ultraviolet) absorber(s) can be incorporated into the compositions by first mixing it (preferably, dissolving it) in one or more low VOC coalescents (preferably in which it is soluble) as described herein, and mixing the resulting mixture (preferably, solution) either with the pigment premix (i.e., pigment grind) and/or the polymer particles, or completed pigment/polymer mixture. Preferably, it is added to the pigment premix or the polymer particles. More preferably, it is added to the polymer particles.

Thus, herein the water-based compositions can be prepared by a method that includes: providing an aqueous polymer comprising a latex or water-dispersible polymer in water; providing an additive package comprising at least one of a pigment, a thickener, a mildewcide, a biocide, a defoamer, a surfactant, a dispersant, a filler, and combinations thereof; providing one or more water-insoluble UV-VIS (preferably, ultraviolet) absorbers capable of absorbing radiation within a range of 240-465 (preferably, 240-400) nm; providing one or more low VOC coalescents having a volatile organic content of 30% or less; dissolving the one or more water-insoluble UV-VIS (preferably, ultraviolet) absorbers in the one or more low VOC coalescents to form a absorber-coalescent mixture (preferably, solution); mixing the aqueous polymer with the additive package; and before or after mixing the aqueous polymer with the additive package, the absorber-coalescent mixture (preferably, solution) is mixed with the aqueous polymer, the additive package, or both to form a water-based coating.

That is, the absorber-coalescent mixture (preferably, solution) can be mixed with the aqueous polymer, or with the additive package, or with both before mixing the aqueous polymer with the additive package together. Alternatively, the aqueous polymer and additive package can be mixed together and then the absorber-coalescent mixture (preferably, solution) can be added to it.

A preferred method involves mixing the absorber-coalescent mixture (preferably, solution) with the aqueous polymer, and subsequently mixing the aqueous polymer (having the absorber-coalescent therein) with the additive package.

ILLUSTRATIVE EMBODIMENTS

1. A method of preparing a water-based composition, the method comprising:

providing an aqueous polymer comprising a latex or water-dispersible polymer in water;

providing an additive package comprising at least one of a pigment, a thickener, a mildewcide, a biocide, a defoamer, a surfactant, a dispersant, a filler, and combinations thereof;

providing one or more water-insoluble UV-VIS (preferably, ultraviolet) absorbers capable of absorbing radiation within a range of 240-465 (preferably, 240-400) nm;

providing one or more low VOC coalescents having a volatile organic content of 30% or less, or that elute from a GC column at the same time or after methyl palmitate under the same conditions;

mixing the one or more water-insoluble UV-VIS (preferably, ultraviolet) absorbers in the one or more low VOC coalescents to form an absorber-coalescent mixture; and combining the aqueous polymer, the additive package, and the absorber-coalescent to form a water-based coating.

2. The method of claim 1 wherein combining the aqueous polymer, the additive package, and the absorber-coalescent to form a water-based coating comprises:

mixing the aqueous polymer with the additive package; and before and/or after mixing the aqueous polymer with the additive package, the absorber-coalescent mixture is mixed with the aqueous polymer, the additive package, or both to form a water-based coating.

3. The method of embodiment 2 wherein mixing the absorber-coalescent mixture with the aqueous polymer, additive package, or both occurs before mixing the aqueous polymer with the additive package.

4. The method of embodiment 2 wherein the method comprises mixing the UV-absorber-coalescent mixture with the aqueous polymer, and subsequently mixing the aqueous polymer having the absorber-coalescent therein with the additive package.

5. The method of claim 1 wherein mixing the one or more water-insoluble ultraviolet absorbers in the one or more low VOC coalescents to form an absorber-coalescent mixture comprises dissolving the one or more water-insoluble ultraviolet absorbers in the one or more low VOC coalescents to form an absorber-coalescent solution.

6. The method of any of embodiments 1 through 5 wherein the water-based composition comprises a sufficient amount of the one or more coalescents to facilitate coalescence of the aqueous polymer.

7. The method of any of embodiments 1 through 6 wherein the water-based composition comprises a sufficient amount of the one or more water-insoluble UV-VIS (preferably, ultraviolet) absorbers to improve dirt pick-up resistance of the water-based composition by at least 10%, relative to the same water-based composition without the UV-VIS (preferably, ultraviolet) absorber, based on a change in ΔE values.

8. The method of embodiment 7 wherein the water-based composition comprises a sufficient amount of the one or more water-insoluble UV-VIS (preferably, ultraviolet) absorbers to improve dirt pick-up resistance by at least 50%, relative to the same water-based composition without the UV-VIS (preferably, ultraviolet) absorber, based on a change in ΔE values.

9. The method of any of embodiments 1 through 8 wherein the water-based composition comprises at least 0.1 wt-% of the one or more UV-VIS (preferably, ultraviolet) absorbers, based on the weight of the polymer solids.

10. The method of any of embodiments 1 through 9 wherein the water-based composition comprises up to 5.0 wt-% of the one or more UV-VIS (preferably, ultraviolet) absorbers, based on the weight of the polymer solids.

11. The method of any of embodiments 1 through 10 wherein the one or more water-insoluble photoinitators are capable of absorbing UV radiation within a range of 315-375 nm.

12. The method of any of embodiments 1 through 11 wherein the one or more water-insoluble photoinitators is selected from the group of benzophenone, polymeric benzophenone, phenylbis(2,4,6-trimethylbenzoyl)phosphine oxide, ethyl-2,4,6-trimethylbenzoylphenylphosphinate, 2,4,6-trimethylbenzophenone, 4-methylbenzophenone, 2,2-dimethoxy-1,2-diphenylethanone, 1-hydroxycyclohexyl phenyl ketone, 2-hydroxy-2-methyl-1-phenyl-1-propanone, isopropylthioxanthone, methyl-o-benzoyl-benzoate, methylbenzoylformate, benzoin ethyl ether, 4'-ethoxyacetophenone, and combinations thereof.

13. The method of embodiment 12 wherein the one or more water-insoluble photoinitators is benzophenone.

14. The method of any of embodiments 1 through 13 wherein the water-based composition is a paint, a sealer (pigmented or unpigmented), a caulk, or a sealant.

15. The method of embodiment 14 wherein the water-based composition is a coating composition.

16. The method of any of embodiments 1 through 15 wherein the additive package comprises a pigment grind.

17. The method of embodiment 16 wherein the water-based composition is in the form of a paint having one or more additives selected from the group consisting of pigments, fillers, thickeners, biocides, mildewcides, surfactants, dispersants, and defoamers.

18. The method of any of embodiments 1 through 17 wherein the aqueous polymer comprises a latex polymer having at least one Tg within a range of −20° C. to 70° C.

19. The method of embodiment 18 wherein the latex polymer has at least one Tg within a range of −20° C. to 60° C.

20. The method of embodiment 19 wherein the latex polymer has at least one Tg within a range of −10° C. to 30° C.

21. The method of any of embodiments 1 through 20 wherein the aqueous polymer comprises a multi-stage latex polymer having at least two Tg peaks or a gradient polymer of gradually changing composition.

22. The method of any of embodiments 18 through 21 wherein the latex polymer comprises the polymerization product of ethylenically unsaturated monomers selected from the group of alkyl acrylates, alkoxy acrylates, alkyl methacrylates, alkoxy methacrylates, vinyl esters of saturated carboxylic acids, monoolefins, and conjugated dienes optionally with one or more monomers selected from the group of styrene, methyl methacrylate, butyl acrylate, 2-ethylhexyl acrylate, vinyl acetate, acrylonitrile, and vinyl chloride.

23. The method of embodiment 22 wherein the latex polymer comprises a surfactant and polymer particles comprising a homopolymer or copolymer including at least one of an acrylate or a methacrylate.

24. The method of any of embodiments 1 through 23 wherein the one or more coalescents do not phase separate from the water-based composition upon standing at 49° C. for four weeks.

25. The method of any of embodiments 1 through 24 wherein the one or more coalescents are present in a sufficient amount to facilitate the formation of a polymer film of a latex polymer at a temperature of less than 25° C.

26. The method of embodiment 25 wherein the one or more coalescents are selected to facilitate, and used in an amount that facilitates, the formation of a polymer film of a latex polymer at a temperature of 4° C. to 10° C.

27. The method of embodiment 26 wherein the one or more coalescents are selected to facilitate, and used in an amount that facilitates, the formation of a polymer film of a latex polymer at a temperature of 4° C. to 5° C.

28. The method of any of embodiments 1 through 27 wherein the coalescent has a volatile organic content of 20% or less.

29. The method of embodiment 28 wherein the one or more coalescents has a volatile organic content of 15% or less.

30. The method of any of embodiments 1 through 29 wherein the one or more coalescents is nonreactive with the aqueous polymer.

31. The method of any of embodiments 1 through 30 wherein the one or more coalescents is dispersible in the water-based composition to form a uniform mixture.

32. The method of any of embodiments 1 through 31 wherein at least one coalescent has the formula:

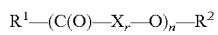

wherein:
R$^1$ is an organic group;
X is a divalent organic group;
r is 0 to 1;
n is 1 to 10; and
R$^2$ is hydrogen or an organic group;
with the proviso that R$^1$ includes at least three carbon atoms when X is not —(CH$_2$)$_s$— wherein s is 2 to 8;
with the proviso that the at least one coalescent has less than two aliphatic unsaturated carbon-carbon bonds when r is zero 33. The method of any of embodiments 1 through 32 wherein the water-based composition comprises at least 1 wt-% of the one or more coalescents, based on polymer solids.

34. The method of embodiment 33 wherein the water-based composition comprises at least 2 wt-% of the one or more coalescents, based on polymer solids.

35. The method of embodiment 34 wherein the water-based composition comprises at least 3 wt-% of the one or more coalescents, based on polymer solids.

36. The method of any of embodiments 31 through 35 wherein:
R$^1$ is an organic group having 3 to 24 carbon atoms;
X is a divalent organic group having 3 to 5 carbon atoms;
r is 1;
n is 1;
R$^2$ is an organic group having less than 100 carbon atoms; and
the coalescent has a number average molecular weight of less than 500.

37. The method of embodiment 36 wherein R$^1$ is an organic group having substituents selected from the group of oxygen atoms, carbonyl groups, hydroxyl groups, and combinations thereof.

38. The method of embodiment 37 wherein R$^1$ is an organic group having 3 to 24 carbon atoms and substituents selected from the group of oxygen atoms, carbonyl groups, hydroxyl groups, and combinations thereof; and wherein R$^2$ is hydrogen.

39. The method of embodiment 38 wherein R$^1$ has the formula R$^3$—(CH$_2$)$_m$—(O(CH$_2$)$_p$)$_q$— wherein R$^3$ is an alkyl or aryl group, m is 0 to 24, p is 1 to 4, and q is 0 to 50.

40. The method of embodiment 39 wherein p is 1 to 2.

41. The method of any of embodiments 36 through 40 wherein X is a divalent organic group having 2 to 8 carbon atoms.

42. The method of embodiment 41 wherein X is an organic group having substituents selected from the group of oxygen atoms, carbonyl groups, and combinations thereof.

43. The method of embodiment 42 wherein X has the formula —(CH$_2$)$_s$—, wherein s is 2 to 8.

44. The method of any of embodiments 1 through 43 wherein at least one coalescent is selected from the group of bis(2-ethylhexyl) maleate, bis(2-ethylhexyl) adipate, bis(2-ethylhexyl) azelate, isodecyl benzoate, tri(ethylene glycol) bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid, monoester of propylene glycol.

45. A method of preparing a water-based composition, the method comprising:

providing an aqueous polymer comprising a latex polymer in water;

providing an additive package comprising at least one of a pigment, a thickener, a mildewcide, a biocide, a defoamer, a surfactant, a dispersant, a filler, and combinations thereof;

providing one or more water-insoluble UV-VIS (preferably, ultraviolet) absorbers capable of absorbing radiation within a range of 240-465 (preferably, 240-400) nm;

providing one or more low VOC coalescents having a volatile organic content of 30% or less, or that elute from a GC column at the same time or after methyl palmitate under the same conditions;

dissolving the one or more water-insoluble UV-VIS (preferably, ultraviolet) absorbers in the one or more low VOC coalescents to form a absorber-coalescent solution;

mixing the absorber-coalescent solution with the aqueous polymer; and subsequently mixing the aqueous polymer having the absorber-coalescent solution therein with the additive package.

46. The method of embodiment 45 wherein the water-based composition comprises a sufficient amount of the one or more coalescents to facilitate coalescence of the latex polymer.

47. The method of embodiment 45 or 46 wherein the water-based composition comprises a sufficient amount of the one or more water-insoluble UV-VIS (preferably, ultraviolet) absorbers to improve dirt pick-up resistance of the water-based composition by at least 10%, relative to the same water-based composition without the UV-VIS (preferably, ultraviolet) absorber, based on a change in ΔE values.

48. The method of embodiment 47 wherein the water-based composition comprises a sufficient amount of the one or more water-insoluble UV-VIS (preferably, ultraviolet) absorbers to improve dirt pick-up resistance by at least 50%, relative to the same water-based composition without the UV-VIS (preferably, ultraviolet) absorber, based on a change in ΔE values.

49. A water-based composition prepared by a method of any of embodiments 1 through 48.

EXAMPLES

The following examples are offered to aid in understanding of the present disclosure and are not to be construed as limiting the scope thereof. Unless otherwise indicated, all parts and percentages are by weight.

TABLE 1

UV Absorbers

| UV Absorber | Manufacturer | Chemical Name | CAS Number | MW | Absorbance peak (nm) |
|---|---|---|---|---|---|
| Benzophenone | Aceto | Benzophenone | 119-61-9 | 182 | 250/332 |
| Irgacure 819DW | BASF | Phenylbis(2,4,6-trimethylbenzoyl)phosphine Oxide | 162881-26-7 | 418 | 300/375 |
| Lucirin TPO-L | BASF | 2,4,6-trimethylbenzoylphenylphosphinic acid ethyl ester | 84434-11-7 | 316 | 375 |
| Esacure TZT | Lamberti | 2,4,6-trimethylbenzophenone & 4-methylbenzophenone | 954-16-5, 134-84-9 | 224, 196 | 250/340 |
| Esacure KB 1 | Lamberti | Benzildimethylketal | 24650-42-8 | 256 | 255/338 |
| Esacure KL 200 | Lamberti | 2-hydroxy-2-methyl-1-phenyl-1-propanone | 7473-98-5 | 164 | 242/328 |
| Ebecryl P39 | Cytec | Polymeric Benzophenone | — | 317 | 195/265 |
| Genocure ITX | Rahn | Isopropylthioxanthone | — | 253 | 259/283 |
| Genocure MBB | Rahn | Methyl-o-benzoyl-benzoate | 606-28-0 | 240 | 246 |
| Genocure MBF | Rahn | Methylbenzoylformate | 15206-55-0 | 164 | 257 |
| BEE | Aldrich | Benzoin ethyl ether | 574-09-4 | 240 | 250 |
| 4-EOA | Aldrich | 4'-Ethoxyacetophenone | 1676-63-7 | 164 | 278 |

These UV Absorbers in Table 1 were pre-screened by incorporating them into a latex polymer without coalescent and compared to benzophenone for dirt pick-up. All showed improvement with respect to no UV absorber, but were not tested further using a low VOC coalescent.

Procedure 1: Preparation of Low VOC Dirt Pick Up Resistance Additive

A sample of 80 grams of Preparation A-G (tributyl citrate or other low VOC coalescent, as shown in Table 2) and 20 g benzophenone were added to an 8-ounce (237-mL) glass jar with screw top. The jars were placed a 60° C. oven for 1 hour, removed, and shaken or mechanically stirred. The jars were returned to the oven for 1 hour and the process was repeated until all the benzophenone was dissolved.

TABLE 2

UV-absorber-coalescent solutions

| Preparation | Coalescent Name | Coalescent Description | Amount Coalescent | Benzophenone |
|---|---|---|---|---|
| A | Tributyl Citrate | Tributyl citrate | 80 g | 20 g |
| B | EDENOL EFC 100 | Oleic acid, monoester with propylene glycol | 80 g | 20 g |
| C | Dioctyl Maleate | Bis 2-ethylhexyl maleate | 80 g | 20 g |
| D | OPTIFILM 400 | Proprietary | 80 g | 20 g |
| E | VELATE 375 | Benzoate Esters | 80 g | 20 g |
| F | BENZOFLEX 50 | Diethyleneglycol and Dipropyleneglycol Dibenzoates | 80 g | 20 g |
| G | Tributyl Citrate | Tributyl Citrate | 100 g | 0 g |

Procedure 2: Paint Making Procedure

A pigment grind was prepared by adding to a grind pot with Cowles dispersing blade, in order, the first 9 ingredients in the paint formula listed in Table 3. The mixture was dispersed at high speed for 20 minutes.

In a second pot, the pigment grind was added to EPS 2792 polymer and the remaining ingredients were added, one at a time. After all other ingredients were added, Preparations A-G were added to the paint. (This is Method 1 Corresponding to Example 1.)

Alternatively, EPS 2792 polymer (Acrylic Latex Polymer, 50% solids) and Preparations A-G (see Table 2 above) were mixed together in a pot for 15 minutes. The pigment grind was added to the letdown pot (with polymer and Preparation A-G). Then the remaining ingredients were added, one at a time, to make the final paint. (This is Method 2 Corresponding to Example 2.)

TABLE 3

Semi Gloss Paint Formulation

| Raw Material | Supplier | Amount |
|---|---|---|
| Water | | 0.83 |
| Tamol 165A | Dow | 6.00 |
| Byk 348 | BYK | 2.0 |
| BYK 28 | BYK | 1.0 |
| Nuosept 498 | Ashland | 3.00 |
| Acrysol RM-2020NPR | Dow | 5.0 |
| Attagel 50 | BASF | 3.00 |
| Minex 10 | World Minerals | 20.00 |
| Kronos 4311 | Kronos | 326.00 |
| EPS 2792 | EPS | 448.00 |
| Water | | 199.17 |
| BYK 28 | BYK | 2.00 |
| ammonium hydroxide | | 1.0 |
| Acrysol RM2020NPR | Dow | 10.00 |
| Acrysol RM-8W | Dow | 7.00 |
| Preparation A-G | — | 10.20 |
| Total | | 1064.20 |

Procedure 3: Lab Dirt Pick-Up Test Procedure

A sample of the paint to be tested was applied to a 3×6 inches aluminum Q panel (or other appropriate substrate) using a wire wound drawdown bar (RDS) to a film thickness of about 3 mils (although other techniques such as a Bird bar, or other applicator suitable of producing a film thickness of about 3 mils). Each paint sample was dried for 24 hours at room temperature (70-75° F., approximately 20-24° C.). Then, each panel was placed outdoors or in a QUVA cabinet for 1 week, with some exposure to sunlight.

The panels were returned to the lab after 1 week exposure and blotted dry if necessary.

A "dirt" slurry was prepared as follows. First, 50 grams (g) red iron oxide (R4097), 40 g yellow iron oxide pigment, and 10 g black iron oxide pigment were combined and hand stirred or shaken until homogenous. Then, 0.5 g TAMOL 731 (dispersant available from Dow Chemical) was added to 200 g deionized water with agitation. The pigment combination was slowly added and mixed for 30 minutes until a smooth slurry has formed.

The slurry was applied to half of the coated panels using a foam applicator or other suitable brush, and dried on panels at room temperature for 3-4 hours.

The dried slurry was washed off each panel by running the panel under water and using a small piece of cheesecloth, rubbing lightly. A clean cloth was used for each panel. The panels were blotted dry and allowed to completely dry (2-4 hours) before measuring change in color, ΔE, using a spectrophotometer. ΔE was measured using a Datacolor Check II Spectrophotometer using CIELab software following ASTM D2244, Standard Test Method for Calculation of Color Differences From Instrumentally Measured Color Coordinates.

Procedure 4: Dirt Pick-Up Testing

The dirt pick-up resistance was evaluated using the Lab Dirt Pick-Up Test Procedure described above. Aluminum panels were prepared in duplicate and results are averaged.

The results are reported as a change in color, ΔE, reading from a spectrophotometer, in Tables 4 and 5.

Example 1. Paints Prepared Using Semi Gloss Formulation and Method 1

A pigment grind was prepared by adding to a grind pot with Cowles dispersing blade, in order, the first 9 ingredients in the paint formula listed in Table 3. The mixture was dispersed at high speed for 20 minutes.

In a second pot, the pigment grind was added to EPS 2792 polymer and the remaining ingredients were added, one at a time. After all other ingredients were added, Preparations A-G (From Table 2) were added to the paint.

These samples were tested using Procedures 3 and 4 and the results reported in Table 4.

TABLE 4

| | ΔE (Change in ΔE) |
|---|---|
| A | 23.89 (−2.89) |
| B | 28.82 (+2.04) |
| C | 26.05 (−0.73) |
| D | 25.56 (−1.22) |
| E | 24.01 (−2.77) |
| F | 24.99 (−1.79) |
| G | 26.78 (control)* |

*Control paint has no ultraviolet absorber, only coalescent.

Example 2. Paints Prepared Using Semi Gloss Formulation and Method 2

A pigment grind was prepared by adding to a grind pot with Cowles dispersing blade, in order, the first 9 ingredients in the paint formula listed in Table 3. The mixture was dispersed at high speed for 20 minutes.

EPS 2792 polymer (Acrylic Latex Polymer, 50% solids) and Preparations A-G (see Table 2 above) were mixed together in a pot for 15 minutes. The pigment grind was added to the letdown pot (with polymer and Preparation A-G). Then the remaining ingredients were added, one at a time, to make the final paint.

These samples were tested using Procedures 3 and 4 and the results reported in Table 5.

TABLE 5

| | ΔE (change in ΔE) |
|---|---|
| A | 7.68 (−18.53) |
| B | 12.96 (−13.25) |
| C | 7.37 (−18.84) |
| D | 7.52 (−18.69) |

TABLE 5-continued

| | ΔE (change in ΔE) |
|---|---|
| E | 10.83 (−15.38) |
| F | 10.17 (−16.04) |
| G | 26.21 (control) |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A water-based composition, comprising:
   a latex polymer;
   methyl-o-benzoyl benzoate; and
   one or more low VOC coalescents having a volatile organic content of 30% or less, or that elute from a GC column at the same time or after methyl palmitate under the same conditions;
   wherein the composition includes no greater than 5 grams of total VOC per 100 grams polymer solids.

2. The composition of claim 1 wherein the latex polymer has at least one Tg within a range of −20° C. to 70° C.

3. The composition of claim 1 wherein the latex polymer comprises the polymerization product of ethylenically unsaturated monomers selected from the group of alkyl acrylates, alkoxy acrylates, alkyl methacrylates, alkoxy methacrylates, vinyl esters of saturated carboxylic acids, monoolefins, and conjugated dienes optionally with one or more monomers, selected from the group of styrene, methyl methacrylate, butyl acrylate, 2-ethylhexyl acrylate, vinyl acetate, acrylonitrile, and vinyl chloride.

4. The composition of claim 3 wherein the latex polymer comprises a surfactant and polymer particles comprising a homopolymer or copolymer including at least one of an acrylate or a methacrylate.

5. The composition of claim 1 wherein the water-based composition comprises a sufficient amount of methyl-o-benzoyl benzoate to improve dirt pick-up resistance of the water-based composition by at least 10%, relative to the same water-based composition without methyl-o-benzoyl benzoate, based on a change in ΔE values.

6. The composition of claim 5 wherein the water-based composition comprises a sufficient amount of methyl-o-benzoyl benzoate to improve dirt pick-up resistance by at least 50%, relative to the same water-based composition without methyl-o-benzoyl benzoate, based on a change in ΔE values.

7. The composition of claim 1 wherein the water-based composition comprises at least 0.1 wt-% of methyl-o-benzoyl benzoate, based on the weight of the polymer solids.

8. The composition of claim 1 wherein the water-based composition comprises up to 5.0 wt-% of methyl-o-benzoyl benzoate, based on the weight of the polymer solids.

9. The composition of claim 1 wherein the one or more coalescents are present in a sufficient amount to facilitate the formation of a polymer film of the latex polymer at a temperature of less than 25° C.

10. The composition of claim 1 wherein the one or more coalescents has a volatile organic content of 15% or less.

11. The composition of claim 1 wherein at least one coalescent is selected from the group of bis(2-ethylhexyl) maleate, bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid, monoester of propylene glycol.

12. The composition of claim 1 further comprising at least one of a pigment, a thickener, a mildewcide, a biocide, a defoamer, a surfactant, a dispersant, a filler, and combinations thereof.

13. The composition of claim 1 wherein the latex polymer is present in an amount of 10 wt-% to 25 wt-%, based on solids.

14. The composition of claim 1 which is a paint.

15. A water-based composition, comprising:

a latex polymer, having at least one Tg within a range of −20° C. to 70° C.;

methyl-o-benzoyl benzoate in an amount of 0.1 wt-% to 5.0 wt-%, based on the weight of the polymer solids; and one or more low VOC coalescents that elutes from a GC column at the same time or after methyl palmitate under the same conditions;

wherein the composition includes no greater than 5 grams of total VOC per 100 grams polymer solids.

16. The composition of claim 15 wherein the latex polymer has at least one Tg within a range of −10° C. to 30° C.

17. A water-based composition, comprising:

a latex polymer;

methyl-o-benzoyl benzoate; and one or more low VOC coalescents selected from the group of bis(2-ethylhexyl) maleate, bis(2-ethylhexyl) adipate, bis(2-ethylhexyl) azelate, isodecyl benzoate, tri(ethylene glycol)bis(2-ethylhexanoate), tetra(ethylene glycol)bis(2-ethylhexanoate), tributyl citrate, octyl benzoate, di(ethylene glycol)dibenzoate, octadecenoic acid methyl ester, and oleic acid monoester of propylene glycol;

wherein the composition includes no greater than 5 grams of total VOC per 100 grams polymer solids.

18. The composition of claim 17 wherein the latex polymer has at least one Tg within a range of −10° C. to 30° C.

19. The composition of claim 17 wherein the methyl-o-benzoyl benzoate is present in an amount of 0.1 wt-% to 5.0 wt-%, based on the weight of the polymer solids.

20. The composition of claim 17 which is a paint.

* * * * *